United States Patent [19]

Huber et al.

[11] Patent Number: 4,548,334
[45] Date of Patent: Oct. 22, 1985

[54] ELECTRIC MOTOR HOUSING WITH END CAP

[75] Inventors: Walter Huber, Bietigheim-Metterzimmern; Fritz Zucker, Sachsenheim, both of Fed. Rep. of Germany

[73] Assignee: ITT Industries, Inc., New York, N.Y.

[21] Appl. No.: 570,780

[22] Filed: Jan. 16, 1984

[30] Foreign Application Priority Data

Jan. 26, 1983 [DE] Fed. Rep. of Germany ....... 3302532

[51] Int. Cl.4 ............................................. H05B 3/60
[52] U.S. Cl. ..................................... 220/293; 310/89
[58] Field of Search ............. 310/40 MM, 89, 42, 258; 138/96 R; 220/293, 298

[56] References Cited

U.S. PATENT DOCUMENTS

| 2,701,318 | 2/1955 | Feirtag | 310/258 |
| 3,321,654 | 5/1967 | Allendorph | 310/258 |
| 3,463,949 | 8/1969 | Stone | 310/42 |
| 3,567,973 | 3/1972 | Mastrodonato | 310/42 |
| 3,732,616 | 5/1973 | Mastrodonato | 310/89 |
| 4,309,815 | 1/1982 | Schmitt | 310/89 |

FOREIGN PATENT DOCUMENTS

| 2124929 | 11/1972 | Fed. Rep. of Germany | 310/89 |
| 2411622 | 9/1975 | Fed. Rep. of Germany | 310/89 |
| 1226243 | 3/1971 | United Kingdom | 310/89 |
| 1236328 | 6/1971 | United Kingdom | 310/89 |

Primary Examiner—R. Skudy
Attorney, Agent, or Firm—Donald J. Lenkszus

[57] ABSTRACT

An end cap for a windshield wiper motor housing includes a cylindrical shell and an end cap, the end cap being retained on the shell without fasteners. This is achieved by placing the end cap within the shell in a prestressed condition and forming supporting elements on one side of the end cap and holding elements on the other side of the end cap. The supporting and holding elements are axially spaced from each other by an amount less than the thickness of the material of the rim of the end cap so that the rim of the end cap in the finished configuration has a corrugated contorn. The forces exerted on the holding and supporting elements by the elasticity of the end cap material effectively prevent the end cap from turning relative to the shell and makes the shell more shock resistant.

4 Claims, 3 Drawing Figures

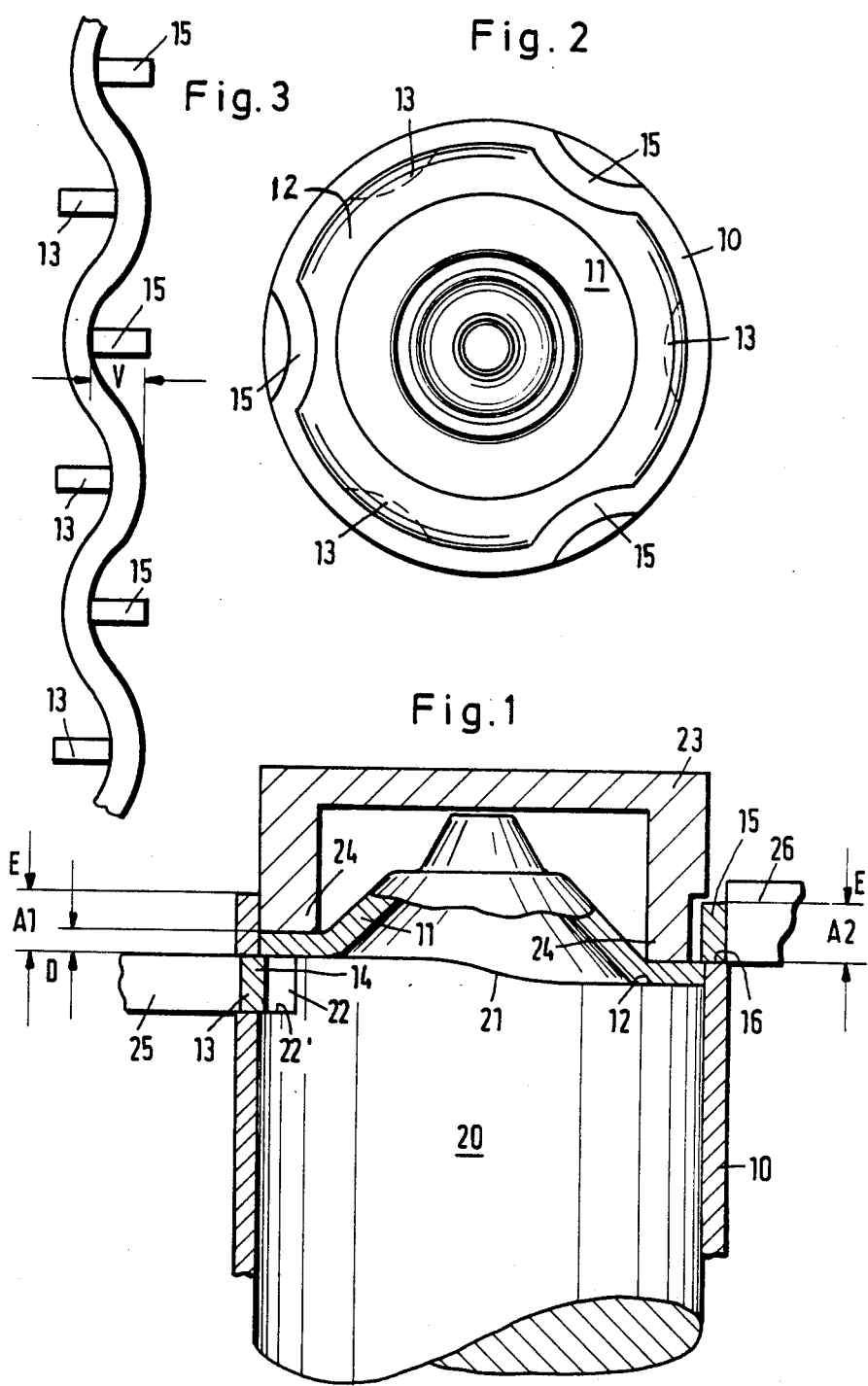

ELECTRIC MOTOR HOUSING WITH END CAP

BACKGROUND OF THE INVENTION

This invention pertains to a windshield wiper motor housing.

From the German specification OS No. 2,411,622 a motor housing is known, in which the end cap is fittingly inserted in a cylindrical shell. The end cap rests upon supporting elements which are embossed on the shell and is secured by holding elements which lap over the rim of the end cap and are then deformed towards the interior of the housing. Thus, the end cap is axially secured at several points between the supporting elements and the holding elements. The contact points are axially opposite the supporting elements. One problem with such an arrangement is that it can not be ensured that the end cap is secured in the shell free from play because of manufacturing tolerances of the parts and the resilience of the holding elements at their bending points. This problem is particularly evident when the thickness of the shell is about 2.5 mm or more. In housings bent or rolled from a sheet metal blank it is especially disadvantageous that the end cap is not tightly secured on the shell, because the housing or the shell often cracks, when struck with a heavy blow. However, also as far as moulded housings are concerned this kind of fastening is not always satisfactory, because the end cap could turn under certain conditions.

From the British patent specification No. 1,226,243 a motor housing is known, in which the supporting elements and the holding elements are offset relative to each other in the circumferential direction. A web above a punched-out slot in the shell serves as a holding element, which web is substantially radially pressed inward. The upper edge of the slot and thus the supporting surface of the holding element is axial spaced from the supporting surface of fthe supporting element by the thickness of the cap. The cap is therefore secured between the supporting elements and the holding elements without prestress. The connection between end cap and shell is improved because the holding elements rest against the cover over areas rather than making point contact therewith. However, this arrangement cannot be utilized with motors having a thick shell because the danger of breaking the die in serial production prevents making the slots.

SUMMARY OF THE INVENTION

Objects of the invention are to improve the stability of the connection between the end cap and the shell of a housing of a windshield wiper motor and to simplify the production method at the same time, so that this method can also be applied to housings with thicker walls.

In accordance with the invention, a particularly solid bracing between the end cap and the shell is achieved, when the end cap is braced between the supporting elements and the holding elements in the axial direction. This is achieved according to the invention in that the supporting elements and the holding elements are axially offset by an amount which is smaller than the thickness of the cap. The rim of the cap which is planar in the relaxed condition thus obtains a corrugated contour. Due to the elasticity of the end cap material forces are exerted onto the supporting elements and the holding elements, so that the shell and the end cap are held together in the area of these supporting elements and of the holding elements.

Thus on the one hand, turning of the end cap relative to the shell is effectively prevented and on the other hand, the risk is diminished that the shell cracks when it receives a blow. Thus a connection between end cap and shell has been created which is absolutely free from play and can be subjected to heavy load.

The method according to the invention for the production of a housing of this kind is characterized in that the end cap is inserted into the shell in the proper position and the outer rim of the end cap serves as a shearing edge for forming the holding element.

In smaller motors where a low prestress is satisfactory it can be sufficient to put the cap with its planar rim in relaxed condition upon the supporting elements, because when the holding elements are formed, the rim of the cap is slightly displaced in the axial direction and thus prestressed due to a certain wedge effect.

In more efficient motors however the end cap of an especially preferred embodiment will be held in the shell prestressed by tools in its final position. Thus the prestress of the rim of the cap is exactly defined by the shape of the tool.

According to an advantageous development, the method can be further simplified in that the inner rim of the end cap is also used to form the supporting elements. Thus the shell punched out of a blank can be directly bent or rolled around an arbor without any preparatory work, then the end cap can be inserted in the shell in proper position and only thereafter are the holding elements and the supporting elements formed.

BRIEF DESCRIPTION OF THE DRAWING

The invention will be better understood from a reading of the following detailed description in conjunction with the drawing in which:

FIG. 1 is a partial section through a motor housing;
FIG. 2 is a front view of the motor housing; and
FIG. 3 is an unwound view of the end cap rim.

DETAILED DESCRIPTION

In FIG. 1 a cylindric housing is shown comprising a shell 10 and an end cap 11. The end cap 11 is in known manner punched out from a planar blank and embossed in a shape as is known from wiper motors. End cap 11 has a supporting rim 12 which, in the relaxed position, lies in a plane. The contour of this supporting rim is adapted to the inner wall of the shell 10 and thus in the present case is circular. Several supporting elements 13 are embossed or cut out of this shell towards the interior. These supporting elements 13 have supporting surfaces 14 which lie in a plane and upon which rests one side of the supporting rim 12. In the circumferential direction and offset to supporting elements 13, holding elements 15 are cut out of the shell. The holding elements have supporting surfaces 16 to which the other side of the supporting rim 12 is adjacent.

In the present invention, the axial arrangement of the supporting elements 13 and of the holding elements 15 relative to a plane of reference is significant. In this embodiment, the plane E defines the front side of the shell 10. The spacing of the supporting surface 14 of the supporting element 13 from this plane of reference E is designated A1 in FIG. 1. The spacing of the supporting surface 16 of the holding element 15 from this plane E is designated A2. In the motor housing according to the aforementioned British patent the spacing A2 is exactly as large as the spacing A1 minus the sheet metal thickness D of the end cap 11. This means that in this known embodiment the supporting rim 12 lies in a plane even after the end cap 11 has been fastened on the shell 10. In contrast thereto, the spacing A2 of the present invention shall be greater than the spacing A1 minus the thickness D. This means that the supporting rim 12 can no longer lie in a plane and, seen in the circumferential direction, gets a corrugated contour. Thus the supporting rim 12 is prestressed from its original shape.

Due to the elasticity of the material, the supporting rim 12 has the tendency to occupy its relaxed condition, so that forces act upon the holding elements and upon the supporting elements which provide a solid connection free from play between the shell 10 and the end cap 11.

In the embodiment shown in the drawing, the holding elements and the supporting elements are arranged almost uniformly distributed over the circumference of the shell, whereby a holding element is provided approximately in the middle between two supporting elements. Thus also the unwound end cap rim of FIG. 3 shows uniform corrugations.

The method for a production of a housing of this kind will be described below in detail by way of FIG. 1:

An arbor 20 can be seen which, distributed over its circumference has several open recesses 22 ending in the front face 21. The front face 21 of this arbor 20 deviates from a plane and is shaped in a way that the supporting rim 12 of the end cap 10 resting against it occupies its final prestressed position. A die 23 with a correspondingly shaped supporting ring 24 presses the end cap 11 against the arbor 20. By means of the arbor 20 and the die 23, the end cap 11 is thus inserted in proper position and prestressed into the shell 10 which has already been bent. Thereafter, the shearing dies 25 and 26 are radially moved inwards and thereby the supporting elements 13 and the holding elements 15 are cut out of the shell 10. Hereby the bases 22′ of the recesses 22 and the inner surface of the rim 12 of the end cap 11 serve as the shearing edge for the supporting elements 13. The outer surface of the rim of the end cap 11 serves as a shearing edge for the holding elemenfts. Thus as is apparent from FIG. 1 the end cap rim serves as a punching tool for the supporting element and for the holding element. Therefore, the supporting elements and the holding elements can be cut at the same time from the shell 10.

The production of a housing according to the present invention provides advantages compared to the prior art arrangements. The shell is punched out of a planar blank. In contrast to the prior art arrangements, no additional slots or embossings have to be made into this blank. Thus, the tool for punching out the shell becomes considerably simpler.

This blank is then bent or rolled around an arbor as in prior arrangements.

Thereafter, the end cap 11 is fittingly inserted in the shell and by means of the arbor 20 and the die 23 brought into its prestressed form in proper position.

At last the holding elements and the supporting elements are cut in one working step and thus the housing is completed.

The connection between the end cap and the shell is thereby considerably stabler than that of known embodiments. The reason is that both, holding elements and supporting elements, rest upon the end cap supporting rim with a supporting surface. Thereby the supporting elements can be pressed towards the housing interior so that they form webs, as has been indicated in FIG. 2. However, pocket-shaped indentations can also be conceived as they have been shown in the German specification OS No. 2,411,622.

The prestressing of the end cap 11 is defined by the shape of the front face 21 of arbor 20 and the corresponding design of the supporting ring 24 of die 23. This initial tension is retained when the end cap is mounted, because the end cap rim serves as a shearing edge. It is not counter-balanced by dynamic operating loads, because the supporting elements and the holding elements are formed in a direction transverse to the direction of the force exerted by the supporting rim.

By the method described motor housings with a relatively thick shell can be produced economically. Thereby the thickness D of the end cap can be smaller than the thickness of the shell. Due to the intimate connection between end cap and shell, the magnetic conductivity and the heat dissipation is further more improved, which is very essential in the case of efficient motors.

In the drawing the invention is not shown true to scale to better illustrate the invention. In particular the drawings of the various Figs. are not shown at the same scale. With the normally used thicknesses of material for motor vehicle wiper motors a prestress V of 0.2–0.3 mm will be sufficient, while in FIG. 1 this prestress corresponds to approximately the thickness of the end cap.

What is claimed is:

1. An electric motor housing comprising:
   a shell; and
   an end cap fittingly inserted in said shell and having a supporting rim which in the relaxed position lies in a plane;
   said shell having a plurality of inwardly extending supporting elements and a plurality of inwardly extending holding elements each of which in a circumferential direction of said shell is offset relative to said supporting elements;
   said end cap having one side of said rim resting against supporting surfaces of said plurality of supporting elements and other side of said rim resting against supporting surfaces of said plurality of holding elements;
   one of said surfaces of at least one of said holding elements being axially spaced from a reference plane a distance greater than the distance one of said supporting surfaces of one of said plurality of supporting elements adjacent thereto minus the thickness of said end cap whereby said end cap is positionally restrained under prestress between at least one of said holding elements and at least one of said supporting elements is inserted.

2. A housing according to claim 1, wherein each of said supporting elements and each of said holding elements form webs which extend transverse to the direction of prestress of said end cap.

3. A housing according to claim 1, wherein said plurality of holding elements and said plurality of supporting elements are at least substantially uniformly distributed over the circumferance of said shell with each of said plurality of holding elements lying between two of said plurality of supporting elements.

4. A housing according to claim 2, wherein said plurality of holding elements and said plurality of supporting elements are at least substantially uniformly distributed over the circumference of said shell with each of said plurality of holding elements lying between two of said plurality of supporting elements.

* * * * *